G. W. FINK.
LOCK JOINT.
APPLICATION FILED NOV. 23, 1914.

1,166,894.

Patented Jan. 4, 1916.

Witnesses
M. P. Nichols
C. L. Weed

Inventor
George W. Fink
by Seymour Earle
Atty.

UNITED STATES PATENT OFFICE.

GEORGE W. FINK, OF NEW HAVEN, CONNECTICUT, ASSIGNOR TO THE ENGLISH & MERSICK CO., OF NEW HAVEN, CONNECTICUT, A CORPORATION.

LOCK-JOINT.

1,166,894.  Specification of Letters Patent.  Patented Jan. 4, 1916.

Application filed November 23, 1914. Serial No. 873,562.

*To all whom it may concern:*

Be it known that I, GEORGE W. FINK, a citizen of the United States, residing at New Haven, in the county of New Haven and State of Connecticut, have invented a new and useful Improvement in Lock-Joints; and I do hereby declare the following, when taken in connection with the accompanying drawings and the characters of reference marked thereon, to be a full, clear, and exact description of the same, and which said drawings constitute part of this application, and represent, in—

Figure 1:
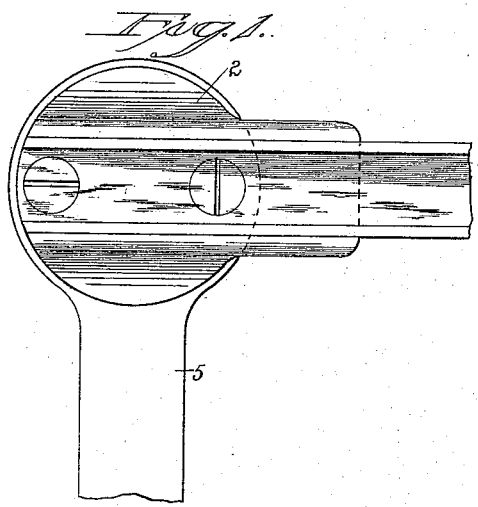
Figure 2:
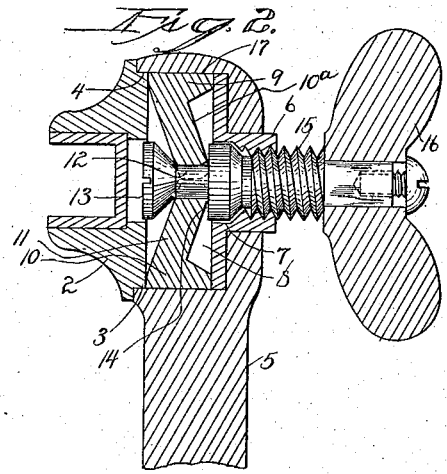
Figure 3:
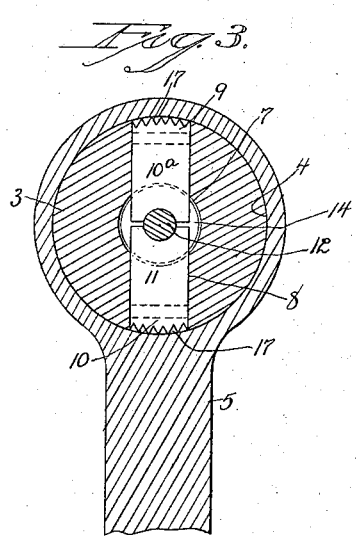
Figure 4:

Figure 1 a side view of a lock joint constructed in accordance with my invention. Fig. 2 a sectional view of the same. Fig. 3 a view in longitudinal section through the hub and frame in which it is mounted. Fig. 4 a face view of one of the dogs, detached.

This invention relates to an improvement in lock joints particularly adapted for the joints of automobile wind shields.

The object of this invention is to provide a device by which the parts may be firmly held by a slight movement of the screw and so as to avoid possibility of slipping or rattling; and the invention consists in the construction hereinafter described and particularly recited in the claims.

In carrying out my invention I employ the usual frame member 2 which is provided with a circular hub or head 3 fitting into a circular socket 4 in the support 5. In this case the head 3 is formed with a centrally arranged outwardly projecting plug 6 which is internally screw threaded and formed at its inner end with an annular recess 7 for the purpose as will hereinafter appear. The hub 3 is also provided with a transverse passage 8 in which clamping dogs 9, 10, are arranged, these dogs having inwardly projecting tails 10ᵃ and 11 which are adapted to be engaged by the reduced stem 12 of a screw 13 which is also provided with a cam-shoulder 14 adapted to enter the recess 7. The shank 15 of the screw engages with threads in the plug 6 and fixed to the outer end of this screw is a thumb nut 16 by which the screw may be turned. The faces 17 of the dogs are transversely serrated so as to firmly grip the inner face of the chamber 4 of the support when the screw is forced inward. The tails of these dogs are inclined with relation to the face and notched so as to set over the screw as clearly shown in Fig. 3 of the drawings. A slight inward movement of the screw forces the shoulder 14 against the inner ends of the dogs and crowds the outer or gripping faces outward into engagement with the inner wall of the recess in the support and owing to the angle of the tails one edge is first forced into engagement with the walls of the recess with but comparatively slight pressure. An outward movement of the screw releases the pressure of the dogs and allows them to swing inward so as to release the hub.

I claim:—

1. A lock joint comprising a support having a smooth face recessed, a member having a hub adapted to enter said recess, said hub formed with an outwardly projecting internally threaded lug, a screw engaging with said lug and formed with a shoulder and with a stem, the dogs mounted in the hub and formed at their outer ends with gripping surfaces, the inner ends of the dogs inclined with relation to the face and bearing against said stem, the inner ends engaged by said shoulder, whereby in the movement of the screw the outer ends of the dogs are forced into or out of engagement with the support.

2. A lock joint comprising a member having a recess, a second member having a hub adapted to enter said recess, said hub formed with an outwardly projecting lug which extends through an opening formed for it in the recessed member, said hub formed with radial openings, dogs mounted in said openings, a screw in engagement with said lug, said screw formed with a head and a shoulder, the inner ends of the dogs engaging with the screw between the head and shoulder whereby by the movement of the said screw the said dogs are moved radially.

In testimony whereof, I have signed this specification in the presence of two subscribing witnesses.

GEORGE W. FINK.

Witnesses:
HARRIETT FAULL WILLIAMS,
JOHN B. KENNEDY.

Copies of this patent may be obtained for five cents each, by addressing the "Commissioner of Patents, Washington, D. C."